Aug. 29, 1950 R. M. CAIN 2,520,757

PHONOGRAPH-SHOCK AND VIBRATION ABSORBING SUPPORT

Filed June 15, 1946

INVENTOR.
ROBERT M. CAIN

BY Ostrolenk and Faber

ATTORNEYS

Patented Aug. 29, 1950 2,520,757

UNITED STATES PATENT OFFICE 2,520,757

PHONOGRAPH-SHOCK AND VIBRATION ABSORBING SUPPORT

Robert M. Cain, Charlotte, Mich., assignor to Wilcox-Gay Corporation, Charlotte, Mich., a corporation of Michigan Application June 15, 1946, Serial No. 676,889

4 Claims. (Cl. 248—22)

My invention relates to sound apparatus and more particularly to a mounting means for the base plate of a phonograph or other device, which mounting will avoid microphonism between elements of the phonograph and the loud speaker, and which will also serve to absorb other physical shocks or vibrations.

Heretofore one of the problems which arose in connection with phonographs mounted in cabinets is that the vibrations transmitted from the loud speaker through the cabinet to the pick up arm of the phonograph tended to result in the production of microphonic noises.

In an attempt to avoid such microphonism, the pick up arm of the phonograph was resiliently mounted or its post was spaced by a shock absorbing grommet from the mounting plate. This, however, introduced unforeseen lateral and vertical compliance in the pick up arm mounting which interfered substantially with the efficiency of the pick up arm. Some of the vibrations transmitted to the pick up needle by the record were absorbed even before they could reach the pick up crystal or other pick up unit owing to the fact that the pick up unit itself could move slightly laterally and was able to twist slightly in a vertical plane.

My invention provides a novel means for mounting the entire base plate of the mounting unit so that all of the elements thereof are insulated mechanically from the cabinet which contains the loud speaker.

My invention specifically contemplates novel mounting means for the base plate of a phonograph or other support for the pick up arm, cutting arm and other elements of the phonograph which mounting means is capable of absorbing both vertical and horizontal shocks and vibrations as well as shocks and vibrations in other planes.

A primary object of my invention therefore is the provision of a shock-absorbing mounting for the base plate of a phonograph or other similar unit.

Another object of my invention is the arrangement of a grommet mounting in such a manner that it may readily absorb horizontal and vertical vibrations, as well as vibrations in planes at angles thereto.

A further object of my invention is the provision of a force-distributing grommet mounting means so arranged that it will yield to varying degrees in response to shocks or vibrations of varying intensity; yielding progressively to a greater degree as the shocks or vibrations become more intense.

This is distinctly different from the usual grommet arrangement in which the compressibility curve flattens out as greater shocks or vibrations are encountered.

The foregoing and many other objects of my invention will become apparent in the following description and drawings in which Figure 1 is a top plan view of a mounting plate of a phonograph showing my novel mounting.

Figures 1, 2, 3, 4:
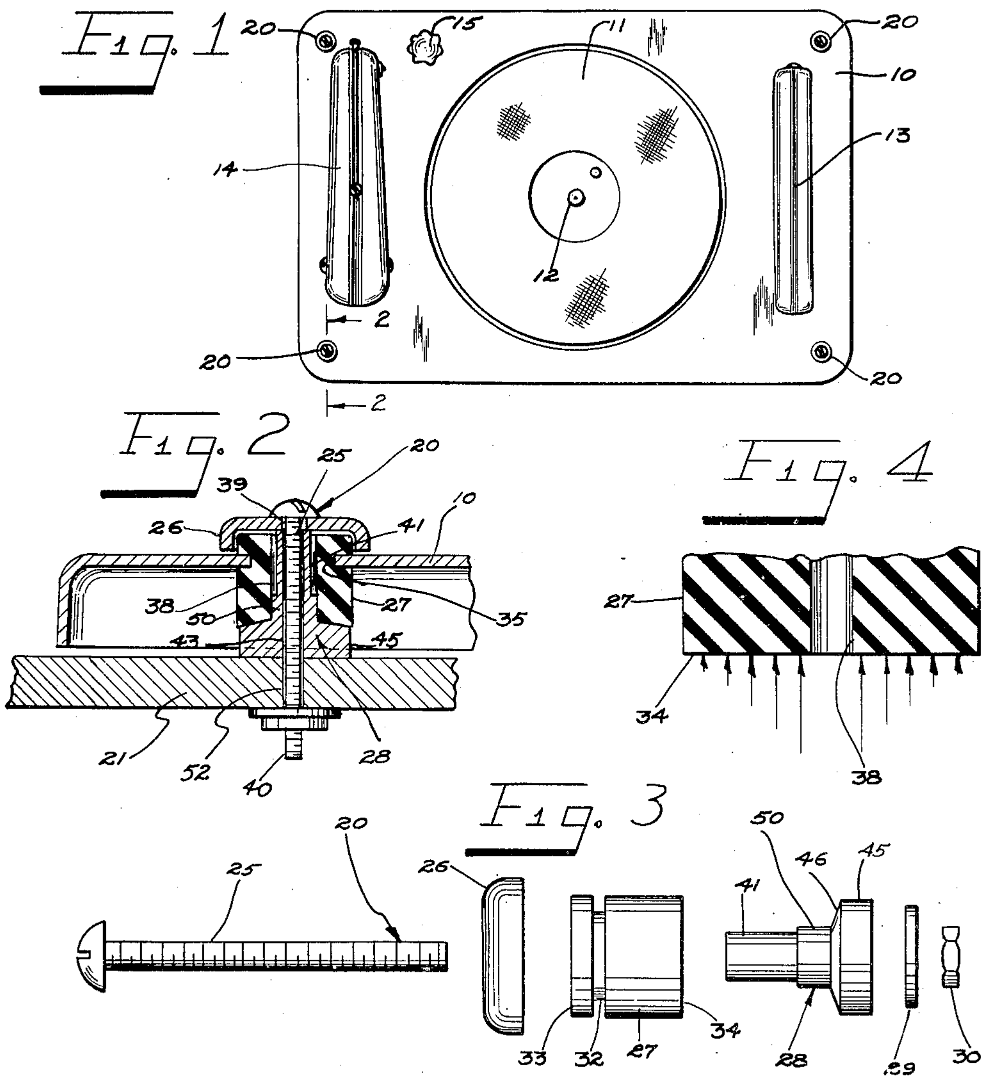
Figure 2 is a cross-sectional view taken on line 2—2 of Figure 1.
Figure 3 is an expanded view of the novel mounting device of Figure 2.
Figure 4 is a schematic diagram showing the force distribution on the grommet of my novel mounting device.

Referring now to Figure 1, I have here shown a phonograph base plate 10 on which is mounted the turn table 11 rotating about the spindle 12, a pick up arm 13 and a record cutting arm 14. The operation of the turn table is controlled by the switch knob 15. The phonograph here shown is of the type generally illustrated in Patent No. 2,351,948 which is assigned to the assignee of the present invention.

The base plate 10 is mounted in the top of a cabinet and is supported at the top of the cabinet by my novel vibration-damping shock-absorbing mounting means 20, 20, which, in this case, are shown at each of the corners of the base plate. The mounting 20 as shown in Figures 2 and 3 which secures the base plate 10 to the top 21 of the cabinet comprises a bolt 25 of sufficient length to pass from the upper side of base plate 10 to substantially below the under-side of the top member 21 of the cabinet, a washer 26, a rubber grommet 27 and a specially shaped sleeve 28, a washer 29 and a nut 30.

The rubber grommet 27 as shown in Figures 2 and 3 is a substantially cylindrical member having parallel plane opposite ends 33, 34 and an annular groove 32 adjacent the upper surface 33 of the grommet 27. The base plate 10 is provided with a circular opening 35 at each of the corners and the grommet 27 is placed into the opening so that the material of base plate 10 defining the opening 35 is received in the annular groove 32 as shown in Figure 2.

The grommet 27 also as shown in Figure 2 has a central cylindrical hole 38 extending from the surface 33 to surface 34 along the axis of the grommet.

The bolt 25 is passed through the opening 39 in washer 26 and then is passed down through the central opening of the grommet.

The sleeve member 28 is then passed up over the lower end 40 of the bolt 25 so that the extension 41 of the sleeve member 28 enters the cylindrical opening 38 of the rubber grommet 27. For this purpose, of course, the sleeve 28 is provided with a cylindrical central opening 43 of a sufficient size to receive the bolt 25 so that the bolt 25 may slide longitudinally with respect thereto and need not be threaded therein.

The extension 41 of the sleeve member 28 is of less diameter than the cylindrical opening 38 of the grommet. The base 45 of the sleeve 28 is of a diameter substantially equal to that of the grommet as shown in Figures 2 and 3 and the upper surface 46 of the base 45 is substantially conical in arrangement.

The sleeve 28 has an intermediate portion 50 between the narrow extension 41 and the base 45; the said intermediate portion 50 being so dimensioned that it will be a close fit in the lower end of the cylindrical opening 38 of the gromget 27.

With the grommet in place in the opening 35 of the base plate 10 and the bolt 25 and washer 26 in place as shown in Figure 2 and also with the sleeve 28 in the position shown in Figure 2 at the various corners of the mounting plate 10, the mounting plate 10 is then placed on the cabinet so that the ends 40 of each of the bolts 25 at each of the corners register with the openings 52 in the top member 21 of the cabinet.

The mounting plate 10 is then lowered so that the ends 40 of each of the bolts 25 passes through the openings 52 in top member 21 of the cabinet to the under-side of the said top member 21. The washer 29 is then placed over the ends 40 of the bolts 25 and the nut 30 is tightened against the washer pulling down the bolt 25 and tightening the washer 26 against the upper surface 33 of the grommet.

With the mounting plate 10 in place as shown in Figure 2, the load of the mounting plate on each of the grommets 27 causes the lowered surface 34 of each of the grommets to be deformed into a substantially hollow conical form matching the conical form of the surface 46 of base 45 of sleeve 28.

As shown in Figure 4, the load distribution on the lower surface 34 of the grommet 27 is such that most of the load is taken adjacent the cylindrical opening 38 and the load diminishes out toward the outer cylindrical surface of the grommet 27.

The ability of the grommet 27 to absorb shocks and damp vibrations both horizontally and vertically as well as in planes at angles thereto is determined by the conical base surface 46 and by the height of the section 50 of the sleeve which just fits the cylindrical central opening 38 of the grommet 27. This cylindrical portion 50 should be relatively short having only sufficient length to ensure that the sleeve 28 will be centralized with respect to the cylindrical opening 38 of the grommet 27; while the extension 41 of the sleeve 28 is of much less diameter than the cylindrical opening 38 of the grommet 27.

It will thus be seen that the portion of the grommet 27 in the region of the annular groove which engages the opening 35 of the base plate 10 is free to move laterally and even to twist slightly in a plane at an angle to the horizontal and thus to absorb any horizontal shocks or vibrations or any other shocks or vibrations in planes at an angle to the horizontal.

The cooperation of the lower flat surface 34 with the conical surface 46 of the base 45 of the sleeve 28 permits the grommet 27 readily to absorb any vertical shocks or vibrations and permits the grommet also to twist slightly at an angle to the perpendicular to absorb shocks and vibrations in other planes.

The cooperation of these two elements: The spacing of sleeve portion 41 from the side of opening 38 of the grommet and the co-action of the flat surface 34 of the grommet with the conical surface 46 of the sleeve thus permits the absorption of shocks and damping of vibrations in both the horizontal and vertical planes and in planes at angles thereto.

The utilization of four such grommets and their associated elements at each of the four corners of the base plate 10 thus serves to physically insulate the base plate 10 from the remainder of the structure beneath the top surface 21 of the cabinet.

Microphonism between the loud speaker or other portions of the device within the cabinet and the pick up arm, cutting arm or turn table are thereby completely avoided.

Figure 5:
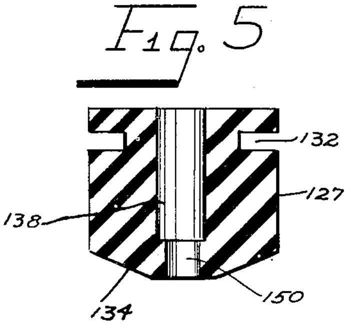
Figures 5 and 6 are views showing modified forms of the grommet and sleeve respectively of the construction of Figures 2 and 3.
Figure 6:
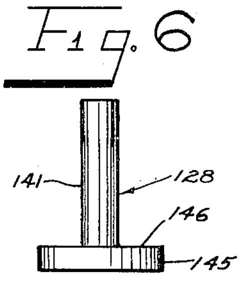

In Figures 5 and 6, I have shown the modified form 127 of the grommet and a modified form 128 of the sleeve which operates in the same manner as that described in connection with Figures 2, 3 and 4.

The annular groove 132 of grommet 127 is received in the opening 35 of base plate 10. The sleeve 128 is mounted through the lower end 150 of opening 138 of the grommet in the manner already described in connection with the similar structures of Figures 2 and 3. The bolt 25, washer 26, washer 29 and nut 30 are utilized in exactly the same manner in connection with the construction of Figures 5 and 6 as has already been described in connection with the prior figures. The extension 141 of the sleeve 128 is spaced from the side of the central opening 138 of grommet 127 by the narrower communicating opening 150 at the lower end of the grommet.

It will thus be seen that with the sleeve 128 in place in the grommet, the side of the opening 138 is spaced from the sleeve for the purposes previously described in connection with the spacing of the extension 41 of the sleeve 28 of Figures 2 and 3 from the inner surface of the opening 38 in the grommet 27.

The grommet of Figure 5 and the base plate mounted thereon may thus readily absorb shocks and damp vibrations in a lateral or horizontal direction. The lower surface 134 of grommet 128 is conical in form as shown, while the upper surface 146 of extension 145 of the sleeve 128 is flat.

When a load similar to the load previously described is placed on the grommet 127, the lower surface 134 thereof is deformed and tends to be flattened against the upper flat surface 146 of extension 145 of the sleeve 128. The load distribution for the lower surface of the grommet 127 is exactly the same as that shown in Figure 4. Accordingly, grommet 127 may also absorb physical shocks in a vertical plane as well as damped vibrations in such vertical plane.

It will also be obvious that the formations of Figures 2 and 3 on the one hand and 5 and 6 on the other hand may be combined, thus the grommet 27 of Figure 2 may be used in connection with the sleeve of the type of sleeve 28 of Figure 3 omitting, however, the side portion 50 of sleeve 28 and substituting in place thereof the smaller opening 150 of grommet 127 in the lower end of cylindrical opening 38 of grommet 27.

The essential element is that the grommet be so formed that it may readily yield to and damp the effect of shocks and vibrations in both vertical and horizontal planes as well as in planes at angles thereto.

It will thus be seen that the grommet is relatively stiff for shocks and vibrations of low intensity; but that as shocks or vibrations become more intense, the grommet becomes relatively more flexible with respect thereto and offers a greater degree of resilience to absorb the same. This is the contrary of the result achieved with the usual compressible grommet which if compressed and becomes less resilient as the intensity of shocks and vibrations increase.

In the foregoing, I have described my invention solely in connection with a specific preferred embodiment thereof. Since many variations and modifications of my invention should now be obvious to those skilled in the art, I prefer to be bound not by the specific disclosure herein contained but only by the appended claims.

I claim:

1. A shock and vibration absorbing support; said support comprising a resilient grommet; means for connecting an upper portion of said grommet to a load to be supported; a base unit against which the lower end of the grommet rests; said grommet being compressed between said load and said base unit; the lower surface of said grommet and the upper surface of said base unit being originally non-parallel surfaces; the lower surface of said grommet being compressed by said load to conform to the upper surface of said base unit; said grommet having a central opening; a central extension from said base in said opening of said grommet; and means spacing said extension from the interior of the surface of the opening in said grommet.

2. A shock and vibration absorbing support; said support comprising a resilient grommet; means for connecting an upper portion of said grommet to a load to be supported; a base unit against which the lower end of the grommet rests; said grommet being compressed between said load and said base unit; the lower surface of said grommet and the upper surface of said base unit being originally non-parallel surfaces; one of said surfaces being convex and the other of said surfaces being flat; the lower surface of said grommet being compressed by said load to conform to the upper surface of said base unit; said grommet having a central opening; a central extension from said base in said opening of said grommet; and means spacing said extension from the interior of the surface of the opening in said grommet.

3. A shock and vibration absorbing support; said support comprising a resilient grommet; means for connecting an upper portion of said grommet to a load to be supported; a base unit against which the lower end of the grommet rests; said grommet being compressed between said load and said base unit; the lower surface of said grommet and the upper surface of said base unit being originally non-parallel surfaces; one of said surfaces being convex and the other of said surfaces being flat; the lower surface of said grommet being compressed by said load to conform to the upper surface of said base unit; said grommet having a central opening; a central extension from said base in said opening of said grommet; and means spacing said extension from the interior of the surface of the opening in said grommet; said last mentioned means comprising a widening of the portion of the extension immediately adjacent the upper surface of said base.

4. A shock and vibration absorbing support; said support comprising a resilient grommet; means for connecting an upper portion of said grommet to a load to be supported; a base unit against which the lower end of the grommet rests; said grommet being compressed between said load and said base unit; the lower surface of said grommet and the upper surface of said base unit being originally non-parallel surfaces; one of said surfaces being convex and the other of said surfaces being flat; the lower surface of said grommet being compressed by said load to conform the upper surface of said base unit; said grommet having a central opening; a central extension from said base in said opening of said grommet; and means spacing said extension from the interior of the surface of the opening in said grommet; said last mentioned means comprising a constriction of the opening in the grommet immediately adjacent the lower surface thereof.

ROBERT M. CAIN.

REFERENCES CITED

The following references are of record in the file of this patent:

UNITED STATES PATENTS

| Number | Name | Date |
|---|---|---|
| 1,587,484 | Holden | June 1, 1926 |
| 1,935,202 | Chamberlain et al. | Nov. 14, 1933 |
| 2,024,728 | Galson | Dec. 17, 1935 |
| 2,195,873 | Lord et al. | Apr. 2, 1940 |
| 2,223,028 | Dobson | Nov. 26, 1940 |
| 2,297,483 | Kuhne | Sept. 29, 1942 |

FOREIGN PATENTS

| Number | Country | Date |
|---|---|---|
| 103,226 | Australia | Feb. 8, 1938 |